(12) United States Patent
Sleeman

(10) Patent No.: US 9,612,101 B2
(45) Date of Patent: Apr. 4, 2017

(54) TOUCH SENSOR FOR NON-UNIFORM PANELS

(71) Applicant: TouchNetix Limited, Fareham, Hampshire (GB)

(72) Inventor: Peter Sleeman, Fareham (GB)

(73) Assignee: TouchNetix Limited, Fareham, Hampshire (GB)

( * ) Notice: Subject to any disclaimer, the term of this patent is extended or adjusted under 35 U.S.C. 154(b) by 286 days.

(21) Appl. No.: 14/378,471

(22) PCT Filed: Feb. 11, 2013

(86) PCT No.: PCT/GB2013/050304
§ 371 (c)(1),
(2) Date: Aug. 13, 2014

(87) PCT Pub. No.: WO2013/121183
PCT Pub. Date: Aug. 22, 2013

(65) Prior Publication Data
US 2015/0028894 A1    Jan. 29, 2015

(30) Foreign Application Priority Data
Feb. 13, 2012 (GB) .................................. 1202403.0

(51) Int. Cl.
*G01B 7/00* (2006.01)
*G06F 3/044* (2006.01)
*G01B 7/14* (2006.01)

(52) U.S. Cl.
CPC .............. *G01B 7/003* (2013.01); *G01B 7/14* (2013.01); *G06F 3/044* (2013.01)

(58) Field of Classification Search
CPC .......... G01R 27/26; G01B 7/00; G01B 7/003; G01B 7/14; G06F 3/044; G06F 2203/04111; G06F 2203/04107; G06F 2203/04103
See application file for complete search history.

(56) References Cited

U.S. PATENT DOCUMENTS

| 5,923,101 A | 7/1999 | Peterson et al. |
| 2007/0144795 A1 | 6/2007 | Tran |

(Continued)

FOREIGN PATENT DOCUMENTS

| WO | 2011/142332 A1 | 11/2011 | |
| WO | 2011/142333 A1 | 11/2011 | |
| WO | WO 2011142332 A1 * | 11/2011 | ............. G06F 3/044 |

OTHER PUBLICATIONS

International Search Report and Written Opinion for corresponding patent application No. PCT/GB2013/050304 dated Apr. 25, 2013.

(Continued)

*Primary Examiner* — Son Le
(74) *Attorney, Agent, or Firm* — Renner, Otto, Boisselle & Sklar, LLP

(57) ABSTRACT

A two-dimensional capacitive touch sensor having a cover layer of varying thickness arranged on top of its electrode structure. An array of sensing nodes is formed between edge portions of the receiver electrodes and adjacent portions of the transmitter electrodes. To compensate for the varying thickness of the cover layer, the length of the edge portions per sensing node is varied to equalize node sensitivity across the sensor and thus suppress the systematic variation in node sensitivity which would otherwise arise as a result of the varying thickness of the cover layer.

9 Claims, 12 Drawing Sheets

(56) References Cited

U.S. PATENT DOCUMENTS

| | | |
|---|---|---|
| 2008/0158183 A1 | 7/2008 | Hotelling et al. |
| 2009/0194344 A1 | 8/2009 | Harley et al. |
| 2010/0238133 A1 | 9/2010 | Wu et al. |
| 2010/0309162 A1 | 12/2010 | Nakanishi et al. |
| 2012/0075238 A1 | 3/2012 | Minami et al. |
| 2013/0015865 A1 | 1/2013 | Izumi |

OTHER PUBLICATIONS

Combined Search and Examination Report for corresponding United Kingdom patent application No. GB1202403.0 dated Jun. 14, 2012.

\* cited by examiner

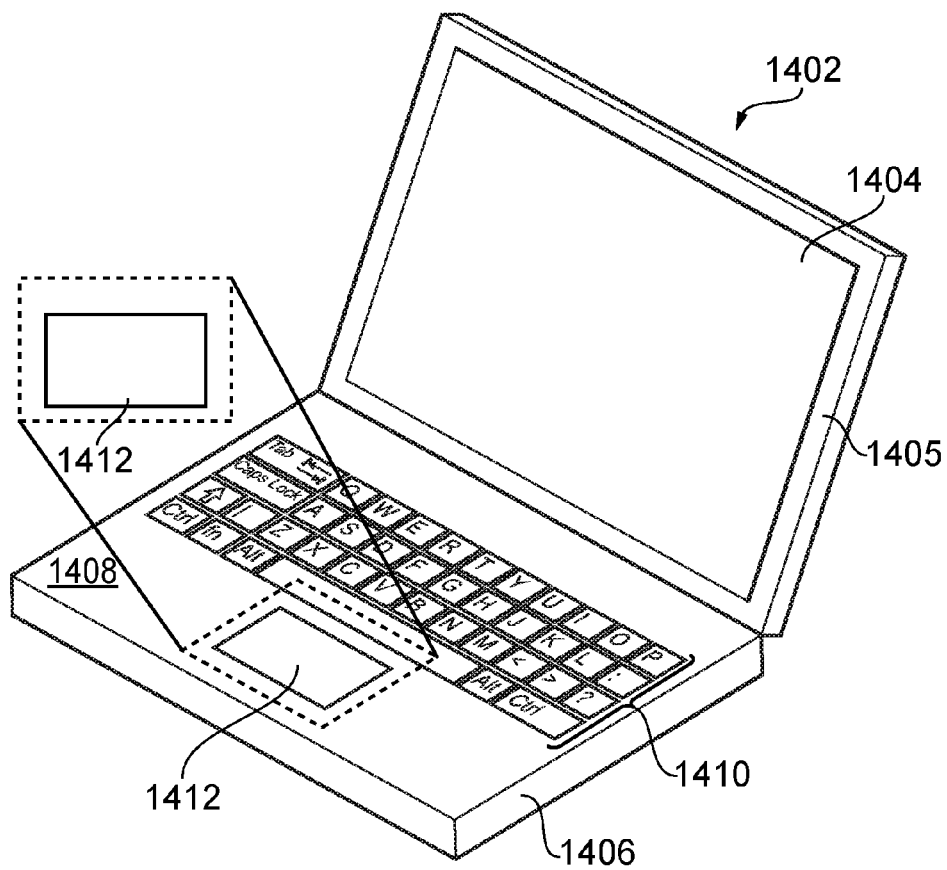
FIG. 12
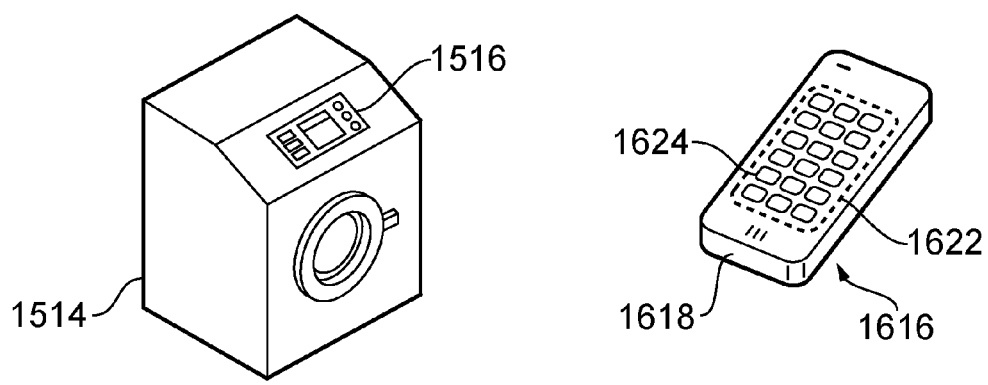
FIG. 13
FIG. 14

TOUCH SENSOR FOR NON-UNIFORM PANELS

This application is a national phase of International Application No. PCT/GB2013/050304 filed Feb. 11, 2013 and published in the English language.

BACKGROUND OF THE INVENTION

The present invention relates to the field of two-dimensional capacitive touch sensors including touch screens and touch pads and their associated sensor and controller chip. In particular, it relates to the specific design of the electrode patterns used to create a physical sensor suitable to sense the presence of one or more touching objects when the sensor is situated behind, or is embedded in, an insulating cover material that is non-uniform in its thickness.

A capacitive touch sensor can be generalised as one that uses a physical sensor element comprising an arrangement of electrically conductive electrodes extending over a touch sensitive area and a controller chip connected to the electrodes and operable to measure changes in the electrical capacitance of each of the electrodes or the mutual capacitance between combinations of the electrodes.

FIG. 1 shows principal components of a generic capacitive touchscreen. Item 100 represents the physical sensor element as a unitary item. In this example the sensor element is constructed from a substrate 103 that could be glass or plastic or some other insulating material and upon which is arranged an array of electrodes consisting of multiple laterally extending parallel electrodes, X-electrodes 101, and multiple vertically extending parallel electrodes, Y-electrodes 102, which in combination allow the position of a touch 109 to be determined. In some cases, each electrode has more detailed structure. The electrodes, which are sometimes called traces, are made of some electrically conductive material such as Indium Tin Oxide (ITO) or copper. The nature of the various materials depends on the chosen characteristics of the touch screen. For example, a touch screen may need to be transparent in which case ITO electrodes and a plastic substrate are common. On the other hand a touch pad, such as provided in lieu of a mouse in lap top computers is usually opaque and hence can use lower cost copper electrodes and an epoxy-glass-fibre substrate (e.g. FR4). Referring back to the figure, the electrodes are electrically connected via circuit conductors 104 to a controller chip 105 which is in turn connected to a host processing system 106 by means of a communication interface 107. The host 106 interrogates the controller chip 105 to recover the presence and coordinates of any touch or touches present on, or proximate to the sensor 103. In the example, a front cover (also referred to as a lens or panel) 108 is positioned in front of the sensor 103 and a single touch on the surface of the cover 108 is shown as 109. Note that the touch itself does not make direct galvanic connection to the sensor 103 or to the electrodes 102. Rather, the touch influences the electric fields 110 that the controller chip 105 generates using the electrodes 102. The touch influence causes a change in the capacitance of one or more electrodes which the controller chip can detect and measure. Using a suitable mathematical manipulation of the relative changes in the electrodes' capacitance, the controller chip 105 can approximate the touch position on the cover's surface as a relative XY coordinate 111. The host system can therefore use the controller chip to detect where a user is touching and hence take appropriate action, perhaps displaying a menu or activating some function.

There are many different material combinations and electrode configurations to allow creation of a capacitive touch screen and the example shown is just one.

A further important concept relates to the way the controller chip uses the electrodes of the sensor element to make its measurement. There are two important classes of controller in this regard.

A first class is known as a "self capacitance" style. Reference is made to FIG. 2. In this design of a capacitive sensor, the controller 201 will typically apply some electrical stimulus 202 to each electrode 203 which will cause an electric field to form around it 204. This field couples through the space around the electrode back to the controller chip via numerous conductive return paths that are part of the nearby circuitry 205, product housing 206, physical elements from the nearby surroundings 207 etc. so completing a capacitive circuit 209. The overall sum of return paths is typically referred to as the "free space return path" in an attempt to simplify an otherwise hard-to-visualize electric field distribution. The important point to realise is that the controller is only driving each electrode from a single explicit electrical terminal 208; the other terminal is the capacitive connection via this "free space return path". The capacitance measured by the controller is the "self capacitance" of the electrode (and connected tracks) relative to free space (or Earth as it is sometimes called) i.e. the "self capacitance" of the electrode. Touching or approaching the electrode with a conductive element 210, such as a human finger, causes some of the field to couple via the finger through the connected body 213, through free space and back to the controller. This extra return path 211 is relatively strong for large objects (such as the human body) and so gives a stronger coupling of the electrode's field back to the controller; touching or approaching the electrode hence increases the self capacitance of the electrode. The controller senses this increase in capacitance. The increase is strongly proportional to the area 212 of the applied touch and is normally weakly proportional to the touching body's size (the latter typically offering quite a strong coupling and therefore not being the dominant term in the sum of series connected capacitances).

In a self capacitance sensor the electrodes are normally arranged as an orthogonal grid, with a first set of electrodes on one side of a substantially insulating substrate and the other set of electrodes on the opposite side of the substrate and oriented at nominally 90° to the first set. There are also structures where the grid is formed on a single side of the substrate and small conductive bridges are used to allow the two orthogonal sets of electrodes to cross each other without short circuiting. One set of electrodes is used to sense touch position in a first axis that we shall call "X" and the second set to sense the touch position in the second orthogonal axis that we shall call "Y". An example is shown in FIG. 4 which is commonly referred to as "the diamond pattern" and is optimally suited to self capacitance XY sensors. In this figure can be seen a first set of electrodes 401 and a second set of electrodes 402 on two sides of a substantially insulating substrate 403. In this example the first set is used to resolve touch (408) position in the X direction 404 and the second set to resolve in the Y direction 405. This position determination can be more clearly understood by reference to the depiction of the relative changes in capacitance using two graphs 406 and 407. The position is computed at high resolution using an interpolation algorithm acting on the relative changes in capacitance from each set of electrodes. This allows use of far fewer electrodes than would be possible without interpolation.

In a self capacitance touch sensor, the controller can either drive each electrode in turn (sequential) or it can drive them all in parallel. In the former sequential case, any neighbouring electrodes are typically grounded by the controller to prevent them becoming touch sensitive when they are not being sensed (remembering that all nearby capacitive return paths will influence the measured value of the actively driven electrode). In the case of the parallel drive scheme, the nature of the stimulus applied to all the electrodes is typically the same so that the instantaneous voltage on each electrode is approximately the same. The drive to each electrode is electrically separate so that the controller can discriminate changes on each electrode individually, but the driving stimulus in terms of voltage or current versus time, is the same. In this way, each electrode has minimal influence on its neighbours (the electrode-to-electrode capacitance is non-zero but its influence is only "felt" by the controller if there is a voltage difference between the electrodes).

The second class of controller is known as a "mutual capacitance" style. Reference is made to FIG. 3. In this design of a capacitive sensor the controller 301 will sequentially stimulate each of an array of transmitter electrodes 302 that are coupled by virtue of their proximity to an array of receiver electrodes 303. The resulting electric field 304 is now directly coupled from the transmitter to each of the nearby receiver electrodes; the "free space" return path discussed above plays a negligible part in the overall coupling back to the controller chip when the sensor is not being touched. The area local to and centred on the intersection of a transmitter and a receiver electrode is typically referred to as a "node". Now, on application or approach of a conductive element 305 such as a human finger, the electric field 304 is partly diverted to the touching object 305. An extra return path to the controller 301 is now established via the body 306 and "free-space" in a similar manner to that described above. However, because this extra return path acts to couple the diverted field directly to the controller chip 301, the amount of field coupled to the nearby receiver electrode 303 decreases. This is measured by the controller chip 301 as a decrease in the "mutual capacitance" between that particular transmitter electrode and receiver electrodes in the vicinity of the touch. The controller senses this decrease in capacitance of one or more nodes. The capacitance decrease is nominally proportional to the area 307 of the touch (although the change in capacitance does tend to saturate as the touch area increases beyond a certain size to completely cover the nodes directly under the touch) and weakly proportional to the size of the touching body (for reasons as described above). The capacitance decrease also reduces as the distance between the touch sensor electrodes and the touching object increases. This is in-line with the normal capacitance equation:

$$C=(\epsilon_0 * \epsilon_r * A)/d$$

As can be seen, the capacitance C is inversely proportional to distance, d.

In a mutual capacitance sensor the transmitter electrodes and receiver electrodes are normally arranged as an orthogonal grid, with the transmitter electrodes on one side of a substantially insulating substrate and the receiver electrodes on the opposite side of the substrate. This is shown in FIG. 3. It should be understood that discussion of a single unitary substrate does not preclude use of a multi-layer substrate which can sometimes be advantageous for cost, ease of fabrication or for other reasons. In FIG. 3 a first set of transmitter electrodes 302 is shown on one side of a substantially insulating substrate 308 and a second set of receiver electrodes 302 is arranged at nominally 90° to the transmitter electrodes on the other side of the substrate. There are also structures where the grid is formed on a single side of the substrate and small insulating bridges are used to allow the transmitter and receiver electrodes to cross each other without short circuiting.

For both classes of controller, in order to accurately sense the position of a touch, the controller needs a stable low noise measurement of the capacitances formed by the physical sensor (each of the nodes in the case of a mutual capacitance type controller or each of the electrodes in the case of a self-capacitance type controller). Best performance is achieved when a touch causes a large relative change in those capacitance proximate to the touch, a small or zero capacitance change in regions away from the touch and that all of the measurements are stable over the time during which they are measured. Of course, in a real world system there are many sources of electrical disturbance that will contaminate the measurements, making them fluctuate. It is also the case that the amount of capacitive change caused by touching is finite. The amount of capacitive change can generally be thought of the "signal" in the system, and the fluctuations in the measurements can be thought of as the "noise". The ability of the overall system to accurately resolve the true touch position on the physical sensor depends on the overall system measurement quality which is known as the signal-to-noise ratio (SNR). It is a fundamental property of a position measurement system (of any type) that the ability of such a system to resolve position is proportional to the SNR of the underlying measurements. Hence, it is a goal of a touch sensing system to simultaneously maximise the "signal" and reduce the "noise".

A second aspect of a touch system that is generally accepted in the industry to be important for good end-user acceptance is the overall "feel" of the system in terms of its sensitivity to touch and that its behaviour is consistent in this regard. A touch sensor is often regarded subjectively as "good" if a very light touch to the surface of the cover lens just causes a response by the system. The exact definition of a "light touch" is elusive and the experience will tend to vary somewhat from user to user, being dependant on their age, gender and digit size, amongst other physical traits. Some users also like to operate touch panels with the back of their finger nails. Equally, a touch sensor that is too sensitive, and tends to respond before the user feels that they have actually contacted the outer lens surface, will often be seen as annoyance as it can tend to give the feeling of responding to "unintended" touches.

For systems using touch sensors that operate from behind an insulating lens/panel of a substantially constant thickness, the SNR across the touch surface will be substantially constant too. Achieving a uniform touch feeling is fairly straightforward; typically the controller will monitor changes in the sensor's capacitances and will apply a simple threshold algorithm to such changes to detect if they are sufficiently strong to warrant the controller transitioning to a "detect confirmed" state and reporting computed X Y position data to the connected host system. As soon as the capacitance changes drop below this threshold (or perhaps a now reduced threshold so affecting an amount of "detect hysteresis") then the controller will return to a "no detect" state and will block X Y coordinate reporting to the host. This "thresholding" is done in a way that is not linked to the actual XY position touched; that is, the threshold is the same at all places on the touch sensor's surface. By reducing the threshold the sensor can be made to feel more sensitive to touch and by increasing the threshold the opposite is true.

A particular challenge arises when the touch sensor is positioned behind a surface that varies substantially in thickness from point to point. An example might be the attractive aesthetic effect of making a 1-dimensional or 2-dimensional curved transparent "lens" on the front of a mobile device.

FIGS. 5A and 5B illustrate in perspective view examples of one- and two-dimensionally curved "lenses". The pleasing smooth curving form of the lens is a positive styling advantage in some cases. Where it is also desired to place a touch sensor behind such a surface an immediate problem can be seen; the sensitivity will vary dramatically from place-to-place. A modified controller detection algorithm can of course take account of the approximate decoded XY position to dynamically adjust the required detection threshold from place-to-place. In effect, the controller uses a deliberately "over sensitive" (lowered) threshold to make an initial determination of XY position for a light touch (or even the approach of a finger prior to making physical contact) anywhere on the sensor and then using a look-up table or formulaic method, computes a secondary threshold that the capacitance change must exceed to enter further into the "detect confirmed" state thus enabling reports of coordinate data to the host. This way the controller can make the overall detection "experience" feel roughly uniform over the surface.

One issue that this adaptive method does not address is that at the thickest part of the lens the SNR of the underlying sensor to a touch is relatively poor by virtue of the increased distance from a touching finger to the sensor electrodes. Hence, computing accurate, low jitter positional data using a regular sensor electrode design is difficult, particularly in high electrical noise environments such as when a portable device incorporating a touch sensor is connected to an external electrical supply, such as to a noisy wall outlet power charger or a wireless charger. Changing the sensor electrode design to improve the SNR over the entire sensor area will also tend to render the outer edges too sensitive (where the lens is thin) and also somewhat prone to secondary effects such as extreme sensitivity to moisture or sweat.

WO 2011/142332 A1 discloses a design of mutual capacitance sensor of the kind shown in FIG. 3 for use with curved lenses as shown in FIGS. 5A and 5B in which, to compensate for varying thickness over the sensor area, the overlap area of the transmitter and receiver electrodes at their sensing nodes (as considered in plan view) is made smaller where the lens is thicker.

WO 2011/142333 A1 discloses a design of self capacitance sensor of the kind shown in FIG. 4 for use with curved lenses as shown in FIGS. 5A and 5B in which, to compensate for varying thickness over the sensor area, the overlap area of the X and Y electrodes at their sensing nodes (as considered in plan view) is made larger where the lens is thicker.

The prior art solutions of WO 2011/142332 A1 and WO 2011/142333 A1 respectively for mutual and self capacitance sensors thus have in common that they vary the node overlap area on the upper and lower sides of the lens to compensate for variation in lens thickness across the sensor area, but differ in that the overlap area is varied in opposite senses.

SUMMARY OF THE INVENTION

According to the invention there is provided a two-dimensional capacitive sensor of the mutual-capacitance type comprising a cover panel of varying thickness and an electrode panel arranged under the cover panel, the electrode panel comprising a plurality of transmitter electrodes extending in a first direction and a plurality of receiver electrodes extending in a second direction, wherein an array of sensing nodes is formed between edge portions of the receiver electrodes and adjacent portions of the transmitter electrodes, wherein the length of the edge portions per sensing node is varied with the thickness of the cover panel so that the edge portion length per sensing node increases as the thickness increases, so as to provide part or substantially complete compensation for variation in node sensitivity across the sensor which would otherwise exist as a result of the varying thickness of the cover panel.

In a first group of embodiments, the transmitter electrodes are arranged in a first plane and the receiver electrodes are arranged in a second plane, the sensing nodes being formed by the receiver electrodes crossing the transmitter electrodes. For example the transmitter electrodes can be formed on a lower surface of a substrate, such as a sheet of glass or plastics material, and the receiver electrodes can be formed on an upper surface of the same substrate. Alternatively, the transmitter and receiver electrodes can be formed on different substrates which are then arranged one on top of the other so that the transmitter and receiver electrodes are separated vertically by one or both of the substrates.

In one type of design, the receiver electrodes are formed with a spine extending in the second direction and cross-bars extending in the first direction, the edge portion length being varied by varying the length of the cross-bars.

The sensing nodes are formed at an overlap area between crossing portions of the transmitter and receiver electrodes. The crossing portions of the receiver electrodes can be adapted in shape not only to vary the edge portion length with cover panel thickness but also to reduce or substantially eliminate variations in the overlap area caused by varying the edge portion length. In particular, in some embodiments the node overlap area can be kept constant to stop capacitance variation.

In one type of design, the receiver electrodes are formed with a spine extending in the second direction and cross-bars extending in the first direction, the edge portion length being varied by varying the length of the cross-bars. Moreover, variations in the overlap area can be reduced or eliminated by making the spine thicker when the cross-bars extend less. In particular, in some embodiments the spine thickness is varied to maintain constant capacitance per node.

In this first group of embodiments, islands of electrode material can be arranged adjacent the transmitter electrodes and/or the receiver electrodes to reduce visual impact of the transmitter electrodes and/or the receiver electrodes.

In a second group of embodiments, the transmitter electrodes are arranged co-planar with the receiver electrodes. In particular, the transmitter and receiver electrodes can be formed as a single layer on the surface of a substrate. The edge portions of the receiver electrodes can be formed so as to interdigitate with the adjacent portions of the transmitter electrodes, with the transmitter and receiver electrodes in the region of the interdigitation being separated by a gap, the size of which determines the capacitive coupling and the extent of the fringe field.

The interdigitation can be defined by finger-like structures. The finger-like structures can be increased in length and/or number per sensing node to increase the length of the edge portions and thus vary the degree of coupling. Other shapes for the interdigitation are also possible, such as simple waves or more complex intermeshed spirals.

The size of the gap per sensing node can be systematically varied with the thickness of the cover panel in a controlled manner, so that the gap size per sensing node increases as the thickness increases. This approach can be used to contribute to partly or substantially completely compensate for variation in node sensitivity across the sensor.

In this second group of embodiments, islands of electrode material are arranged in at least some of the gaps between the transmitter and receiver electrodes to reduce visual impact of the transmitter and receiver electrodes.

The length of the edge portions per sensing node can be varied only in the first direction, only in the second direction, or in both directions to compensate for variation in the cover panel thickness in the first direction, the second direction, or both directions.

It is thus possible to provide a touch sensor electrode arrangement which compliments changes in thickness of an overlying insulating panel or lens.

BRIEF DESCRIPTION OF THE DRAWINGS

The invention is now described by way of example only with reference to the following drawings in which:

FIG. 12 schematically shows a portable personal computer incorporating a sensor according to an embodiment of the invention;

FIG. 13 schematically shows a washing machine incorporating a sensor according to an embodiment of the invention; and FIG. 14 schematically shows a cellular telephone incorporating a sensor according to an embodiment of the invention.

DETAILED DESCRIPTION

For a controller chip of the mutual capacitance type, as has previously been described, the sensor's capacitances are typically formed at the intersections (nodes) of an orthogonal grid of transmit and receive electrodes. The exact material of the electrodes is not important to the invention disclosed here and it will be understood that any conductive material may be suitable.

When the controller chip applies a stimulus to one or more transmitter electrodes, an electric field is formed around said electrode that couples to nearby receiver electrodes. A touching conductive object disrupts some of this field and hence changes the capacitive coupling of the nearby nodes.

Figure 6:
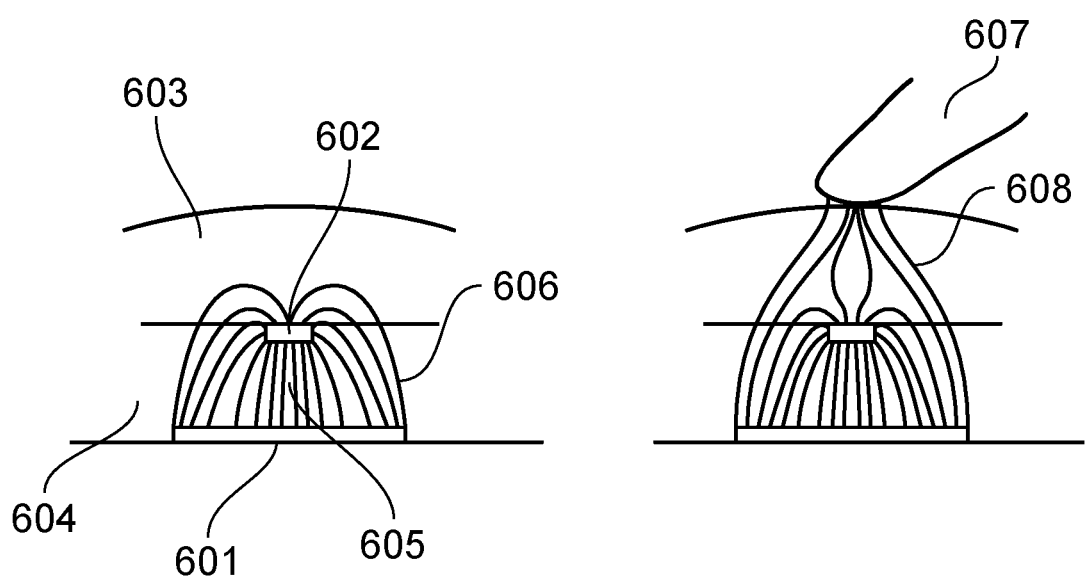
FIG. 6A schematically illustrates in side section a single sensor node of a two-dimensional touch sensor showing field lines in the absence of a touch.
FIG. 6B corresponds to FIG. 6A and shows the field lines in the presence of a touch.

FIGS. 6A and 6B show a single isolated sensing node of mutual capacitance type electrode pattern in cross section. FIG. 6A schematically illustrates in side section a single sensor node of a two-dimensional touch sensor showing field lines in the absence of a touch. FIG. 6B corresponds to FIG. 6A and shows the field lines in the presence of a touch. It can be seen that much of the electric field 608 disrupted by the touching object 607 is what is known as "fringe field" 606, that is it is field which takes a rather indirect path from transmitter electrode 601 to receiver electrode 602. Often such fringe field originates near to the edges of features on the transmit electrode and may terminate on the receiver electrode at edges or surfaces. The lens is shown as 603 and an insulating medium between transmitter and receiver electrodes is shown as 604. It should be understood that other physical structures are possible and that they are equally suitable for consideration of the disclosed invention.

To optimise SNR, it is therefore desirable to maximise the amount of fringe field coupled between transmitter and receiver electrodes as this will yield a large capacitance change when touched. Further, it is desirous to minimise the non-fringe or "static field" component 605 as this is little influenced by the touching object and hence serves only to burden the controller with unnecessary "excess" capacitance measurement which will generally tend to reduce the SNR (unless a controller with a very high dynamic range is employed which can have cost and availability disadvantages).

In order to vary the sensitivity of the sensor in a spatial manner therefore, the electrode pattern at each node can be adapted so that the edge length of the portion of the receiving electrode at a sensing node is varied according to the thickness of the lens at that location. Increasing the receiver electrode edge length at a particular sensing node increases the amount of fringe field, so for a given lens thickness increases the amount of fringe field in relation to the static field. For explanation, we consider two sensing nodes, a "deep" sensing node which is situated under a relatively thick part of the lens and a "shallow" sensing node which is situated under a relatively thin part of the lens. The deep sensing node can be given the same SNR as the shallow sensing node by making the receiver electrode edge length longer for the deep node than for the shallow node. The receiver electrode edge length can thus be varied over the sensor area to follow variations in the lens thickness so as to at least partly, but preferably substantially completely, compensate for variation in node SNR across the sensor which would otherwise exist as a result of the varying thickness of the covering lens.

The edge length can be varied by providing extra receiver electrode "features" in regions where the lens is thicker and to reduce the number of these features in regions where the lens is thinner.

A consequence of varying the edge length at each sensing node can be that the extra features will tend to increase the overlap area between crossing portions of the transmitter and receiver electrodes and hence increase the mutual capacitance at that node. This effect is not generally desirable and can be offset or cancelled by appropriate adaptation of the shape of the receiver electrodes at the crossing points not only to vary the edge portion length with cover layer thickness but also to reduce or substantially eliminate variations in the overlap area caused by varying the edge portion length. In this way, capacitance per sensing node can be equalised across the sensor, or at least variations reduced.

The overlap area can be controlled to balance the overall untouched capacitance of each node, by widening the receiver electrodes in regions where the lens is thinner so as to compensate the reduced capacitance resulting from not including the extra electrode features. Having an overall balanced set of node capacitances may be helpful to optimise the controller's measurements as it allows a common gain factor can be used for all. It can also offer advantages during manufacturing test as it allows a tighter range of acceptable values to be used as a pass/fail criterion.

In general, thin electrode features are good for producing relatively high fringe field to "static field" ratios and are thus favoured to achieve the above goals. However, it is to be understood that other embodiments of the invention could equally achieve a suitable spatial sensitivity variation using wider structures.

Figure 7:
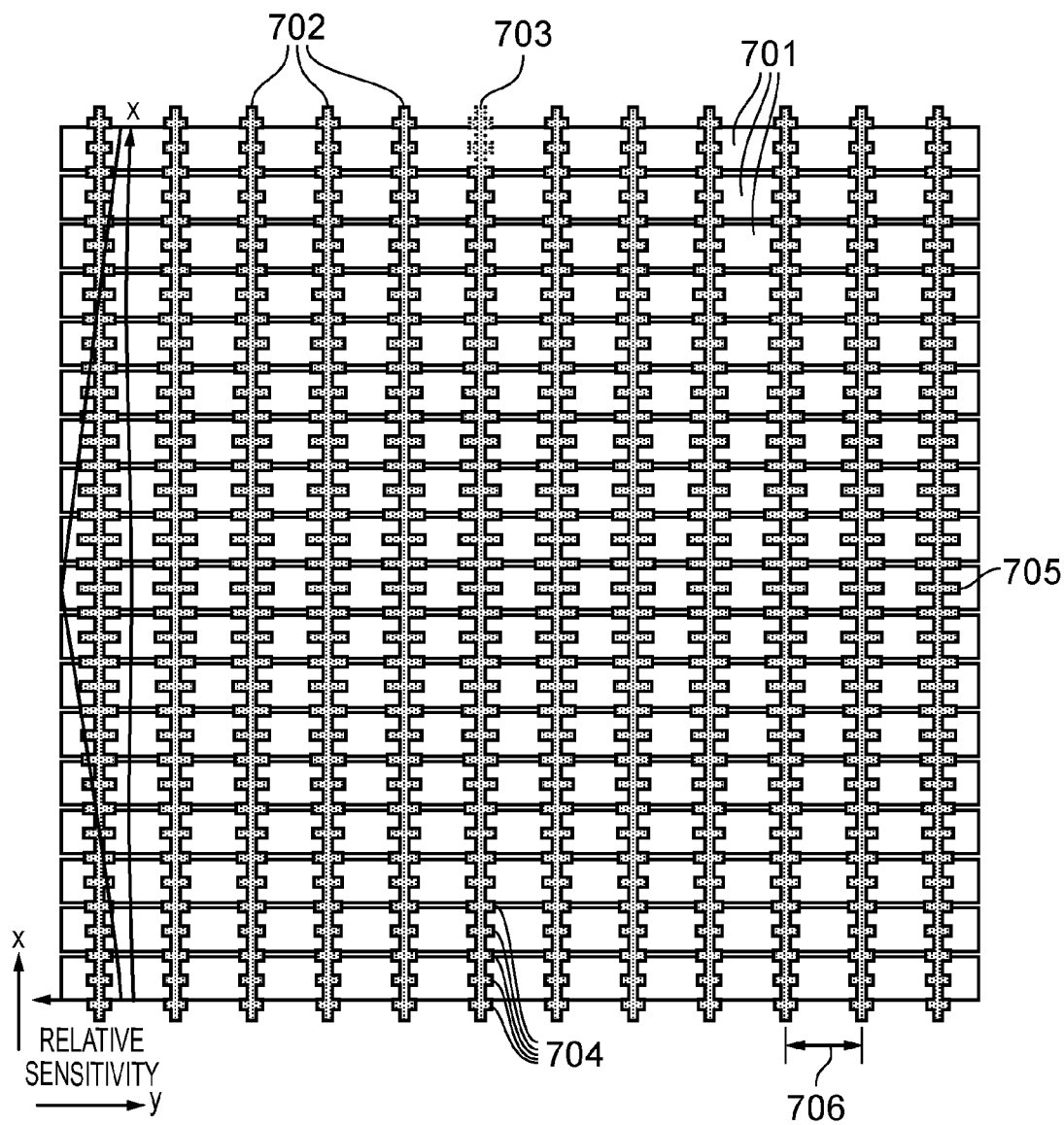
FIG. 7 is a plan view showing the electrode pattern of a mutual-capacitance type touch sensor having a one-dimensionally curved lens according to a first embodiment.

FIG. 7 shows an exemplary diagram of a sensor design optimised to increase SNR progressively towards the middle of the XY region in an approximately linear fashion in one axis. By reference to that figure, a set of transmitter electrodes or traces 701 are shown running at 90° to a first axis that is marked as X. These electrodes are shown as simple bar type structures as is common in the industry and are shown to be approximately the same width in the X axis as the width of each of a plurality of receiver electrodes or traces 702 running at 90° to the Y axis, as marked. This structure can be advantageous as the transmitter electrodes completely cover the receiver electrodes from behind and hence help to make the system insensitive to touches or disturbances from the rear side. As can be seen, each receiver electrode 701 in this example has a substantially constant width "spine" 703 (marked as a dotted outline to show this feature at the top of just one receiver for clarity). Additionally, each receiver spine has a number of "cross members" 704 running at 90° to it that all are part of the same electrical circuit for that receiver. Typically these cross members would be the same material as the spine. As can be seen, the length of each cross member reduces in proportion to its distance from the middle of the X axis. Cross members in the line across the middle of the sensor area 705 are of peak length, this length being chosen to fit the requirements of the receiver electrode pitch 706, while also satisfying any requirements of the node capacitance. There is also a desire not to "crowd" the receiver electrode structures too tightly. This is because the field from the transmitter electrodes needs to fringe upwards past the receiver electrodes so that a touch applied from above can influence said field.

An inset schematic graph 708 shows the approximate sensitivity distribution which approximately linearly reduces towards the edges away from the middle line 705 of the panel in the X direction. By varying the size or shape of the cross members 704 it can be seen that an arbitrary distribution in sensitivity can be achieved.

It is noted that the example in FIG. 7 does not attempt to balance the node capacitances along the X axis; the receiver spines 703 are constant width and there is extra node capacitance in higher measure near the middle line of X caused by the extra cross member features 704. These cross members having greater area and perimeter near the middle therefore adding greater node capacitance.

Figure 8:
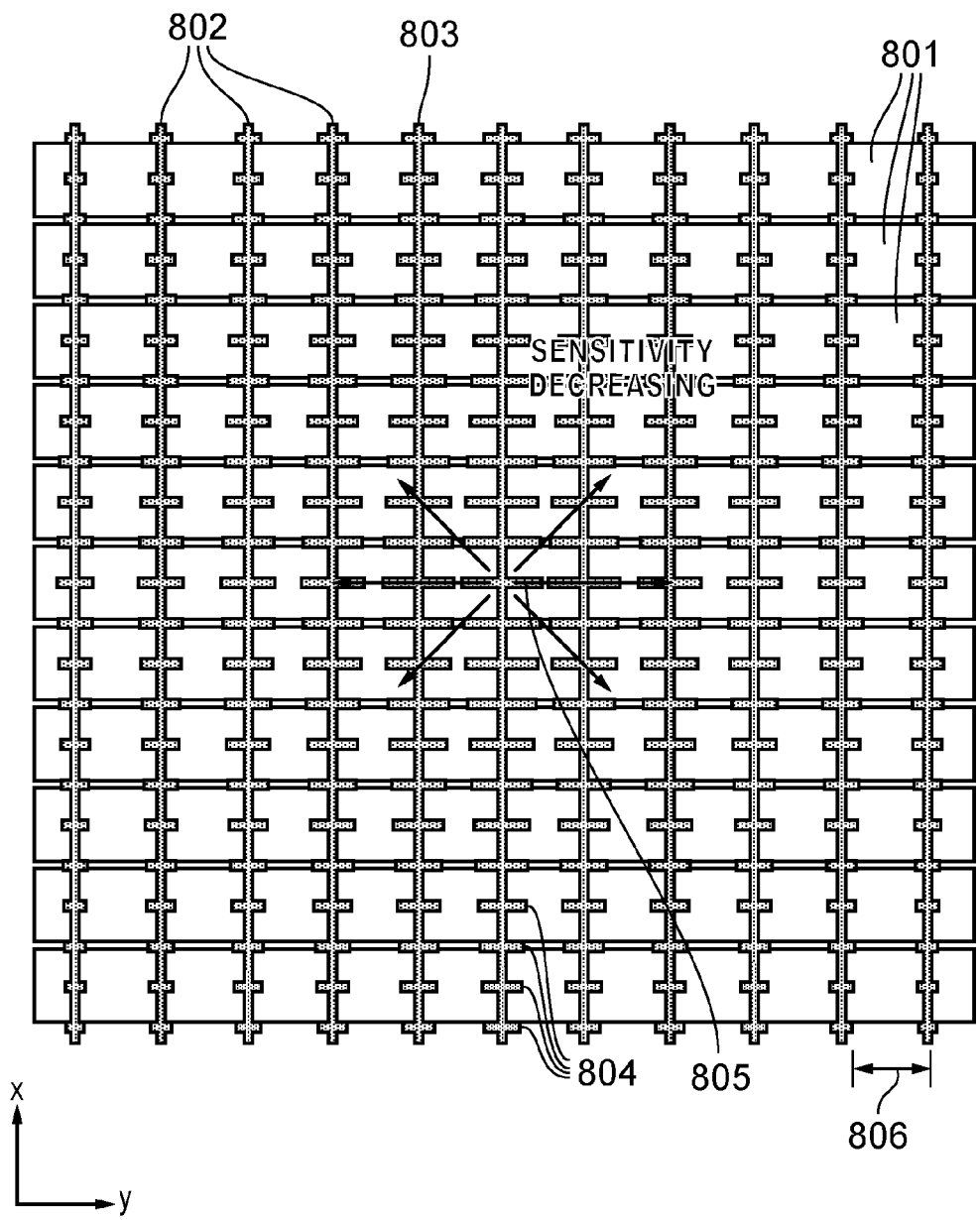
FIG. 8 is a plan view showing the electrode pattern of a mutual-capacitance type touch sensor having a two-dimensionally curved lens according to a second embodiment.

FIG. 8 shows a second example but in this case, the variation in cross-member length is now a function of its position in both X and Y. Corresponding reference numerals are used as in FIG. 7, but with the addition of a hundred, namely:

Transmitter electrodes or traces 801
Receiver electrodes or traces 802
Receiver electrode spines 803
Receiver electrode cross-members 804
Middle point of sensor area 805
Receiver electrode pitch 806

With this design, sensitivity decreases approximately linearly in both directions outward from the middle point of the sensor area 805. Again, it can be seen that by varying the sizes and shapes of the extra cross-member features an arbitrary sensitivity profile can be realised independently for both axes.

Figure 9:
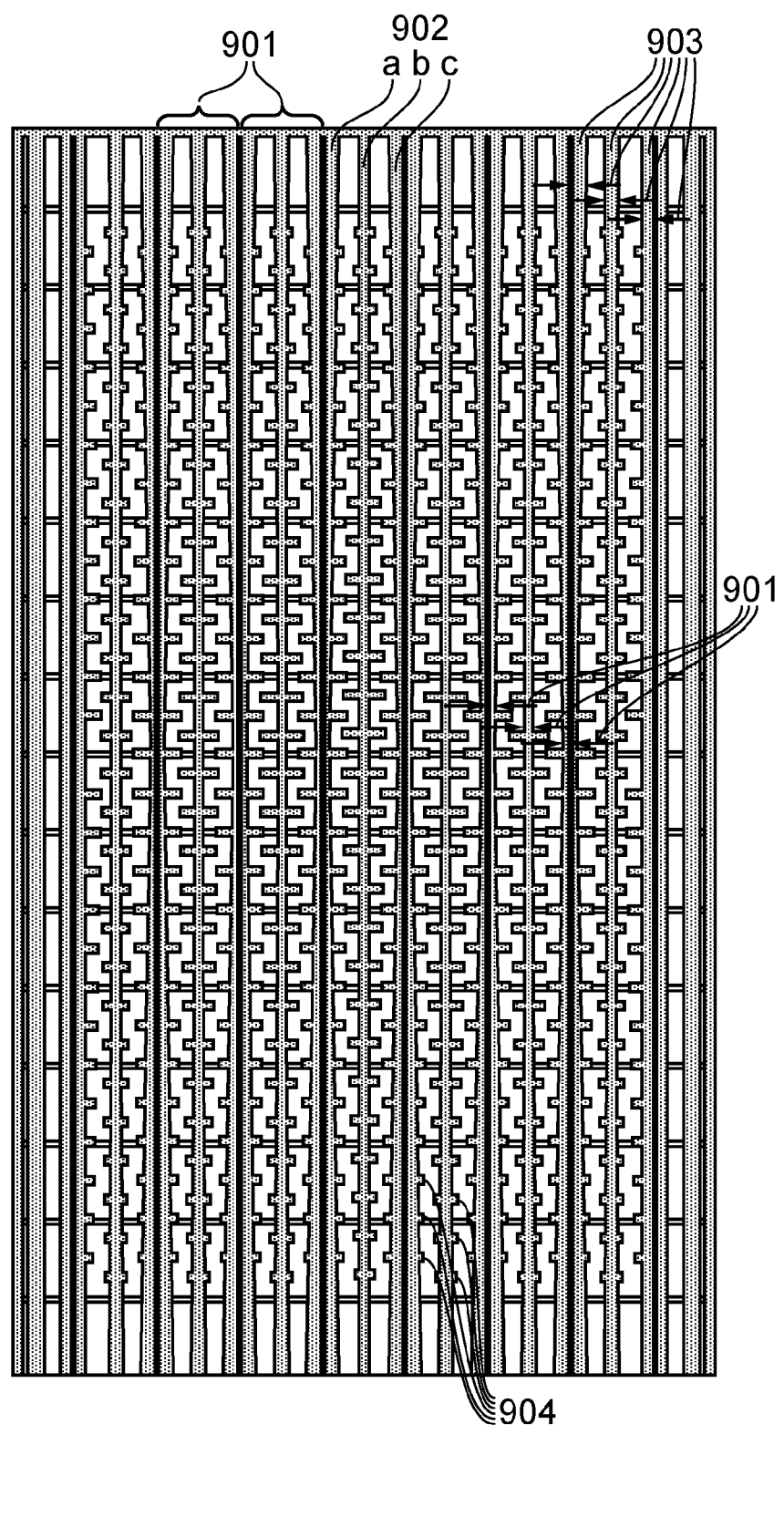
FIG. 9 is a plan view showing the electrode pattern of a mutual-capacitance type touch sensor having a two-dimensionally curved lens according to a third embodiment.

FIG. 9 shows a more complex example. In this design, each receiver electrode 901 is formed from three sub-spines 902a, 902b and 902c. This helps to increase capacitance and minimise signal propagation time for the combined electrode (both of which can be beneficial for some controllers).

It is important to understand that other electrode structures and shapes can be used while achieving the same goals of uniformity of SNR. The cross-members in this figure vary in both X and Y in an approximately radial fashion outwards from the middle point of the panel in X and Y. This pattern is beneficial where the front lens has a thickness that varies approximately in a radial manner being thicker in the middle. FIG. 9 also incorporates a feature in which the widths of the receiver sub-spines 903a, 903b and 903c are varied to approximately balance the node capacitances of all nodes in the sensor. The capacitance "lost" by having shorter cross-members on travelling outwards from the middle, is "gained back" by widening the sub-spines progressively towards the outer edges of X and making the sub spines wider incrementally for those further out from the middle in Y.

Figure 1:
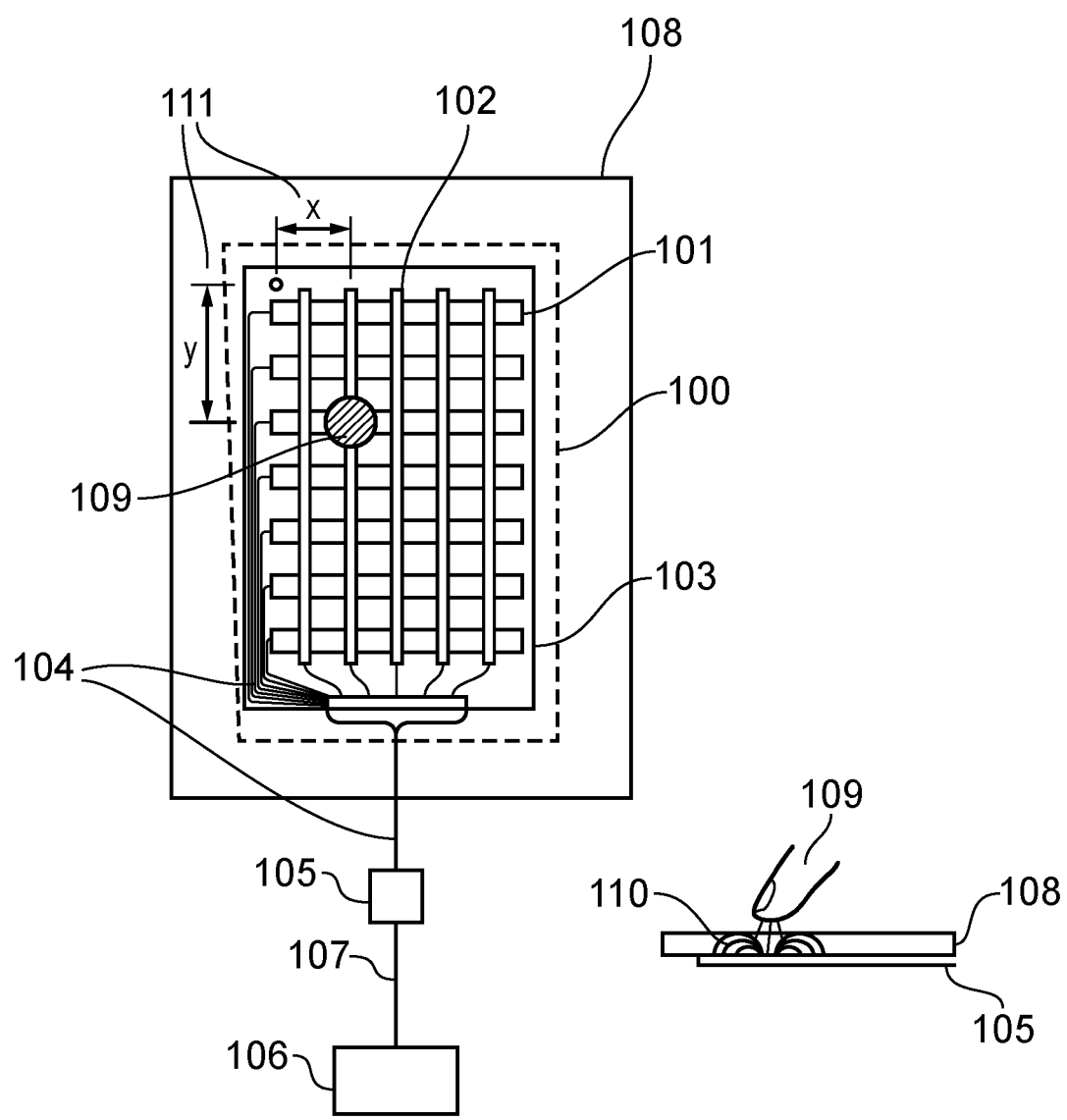
FIG. 1 illustrates a typical touchscreen system.
Figure 2:
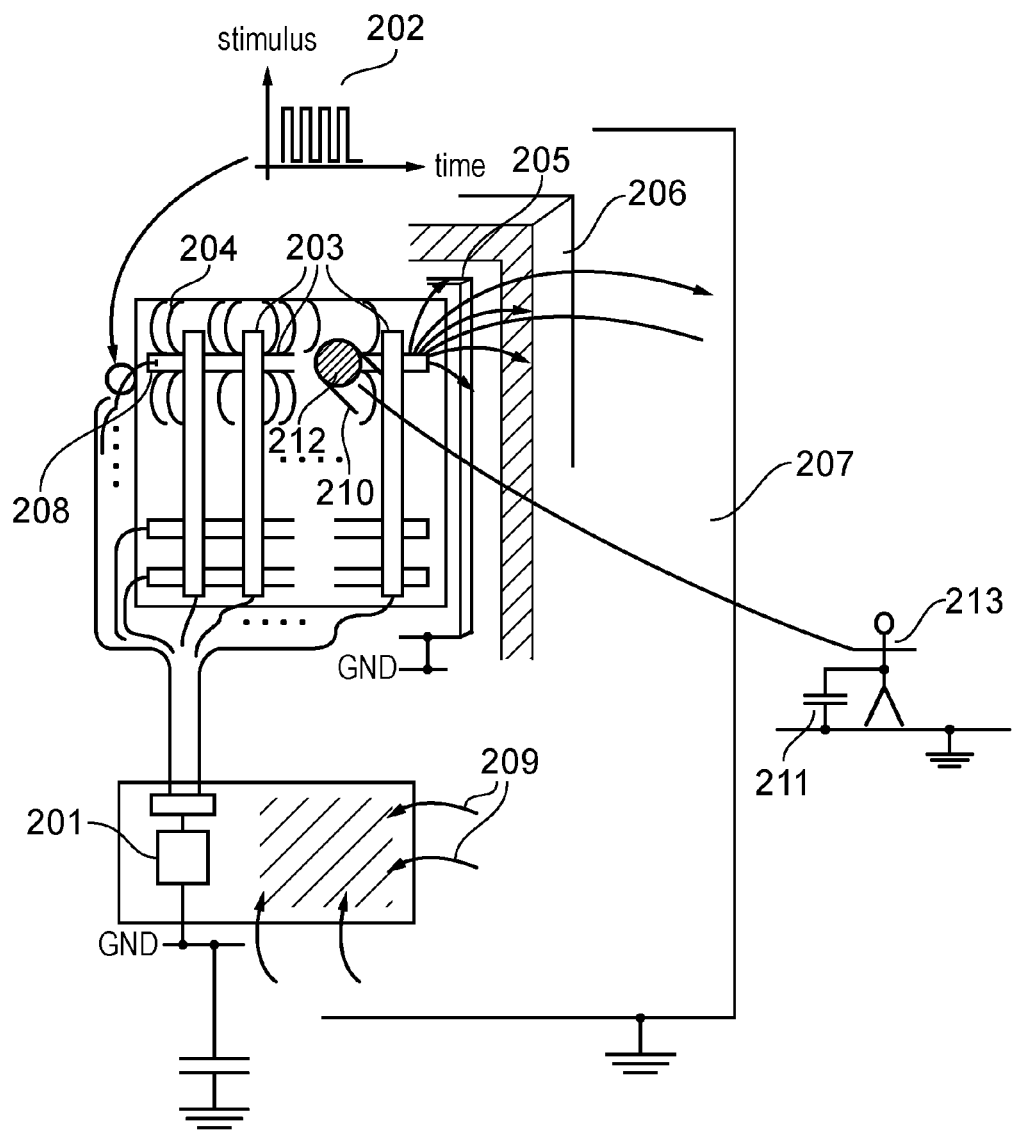
FIG. 2 illustrates a typical self-capacitance touchscreen system.
Figure 3:
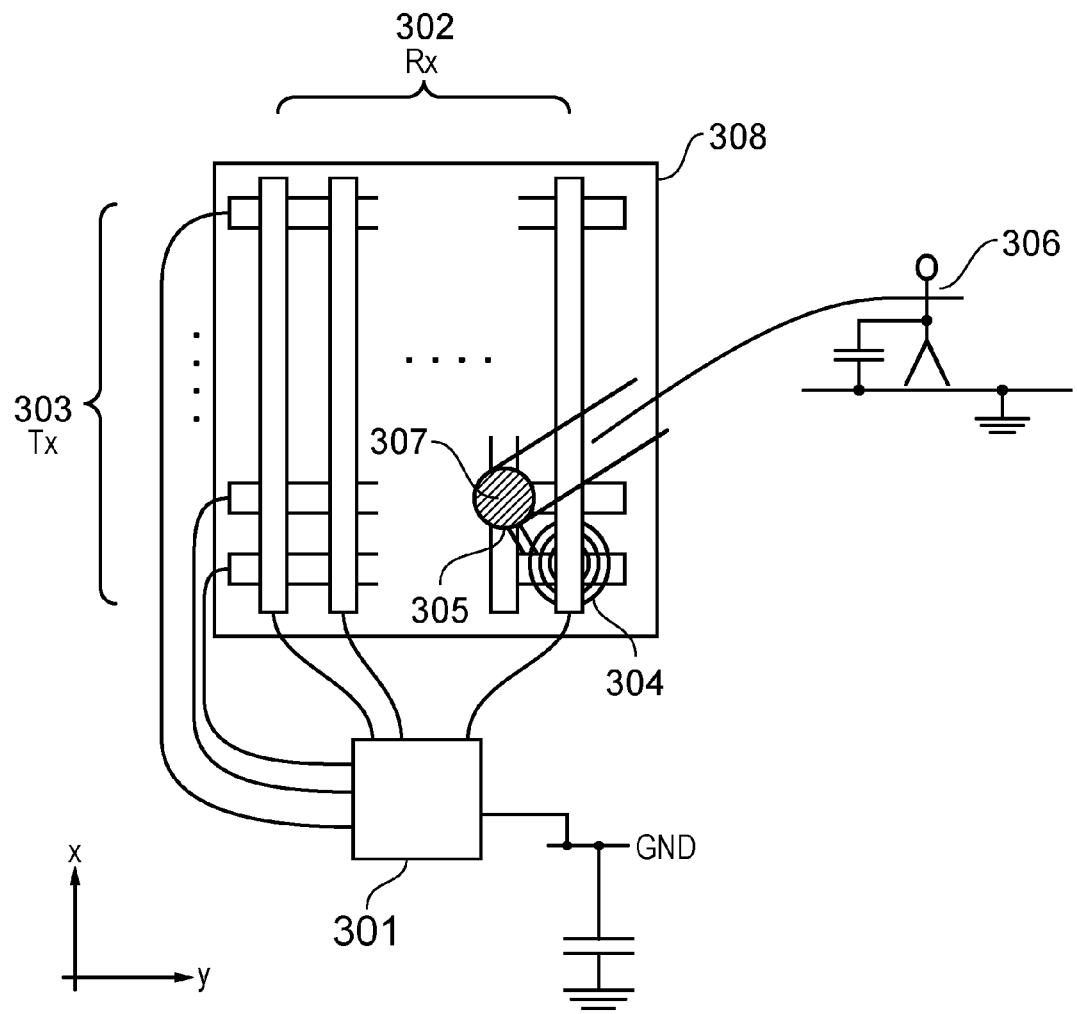
FIG. 3 illustrates a typical mutual-capacitance type touchscreen system.
Figure 4:
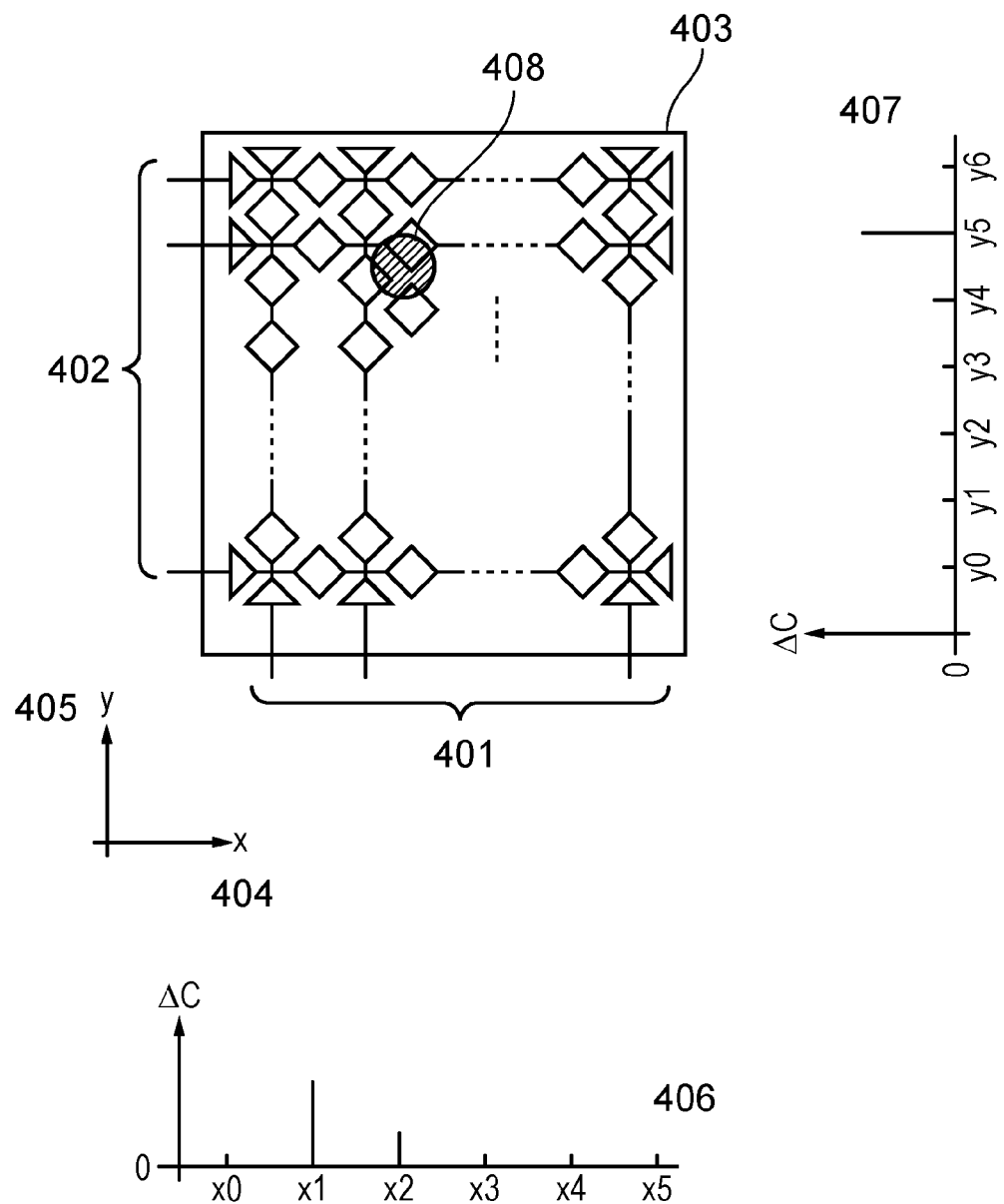
FIG. 4 illustrates a prior art self-capacitance type sensor and signal distribution.
Figure 5:
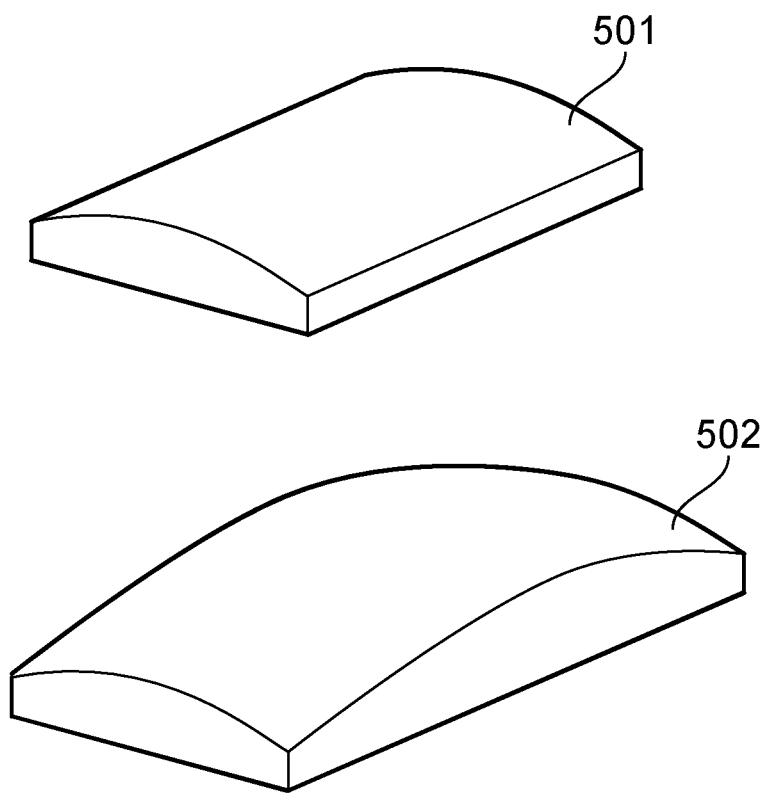
FIG. 5A illustrates in perspective view an example one-dimensionally curved "lens".
FIG. 5B illustrates in perspective view an example two-dimensionally curved "lens".

As well as balancing node capacitances, there is an unrelated benefit to this scheme in that the widened sub-spines tend to crowd each other near the periphery of the touch sensor, i.e. at the far outer edges which shields a high percentage of the area of the transmitter electrodes underneath, blocking their field. This screening effect will further reduce the sensitivity of the nodes near the periphery of the touch sensitive area, where the cover lens will be at its thinnest in a dome or rounded shape of cover. This example would be well suited to a lens like the one shown in FIG. 5B with a smooth radial curvature in 2-dimensions.

Figure 10:
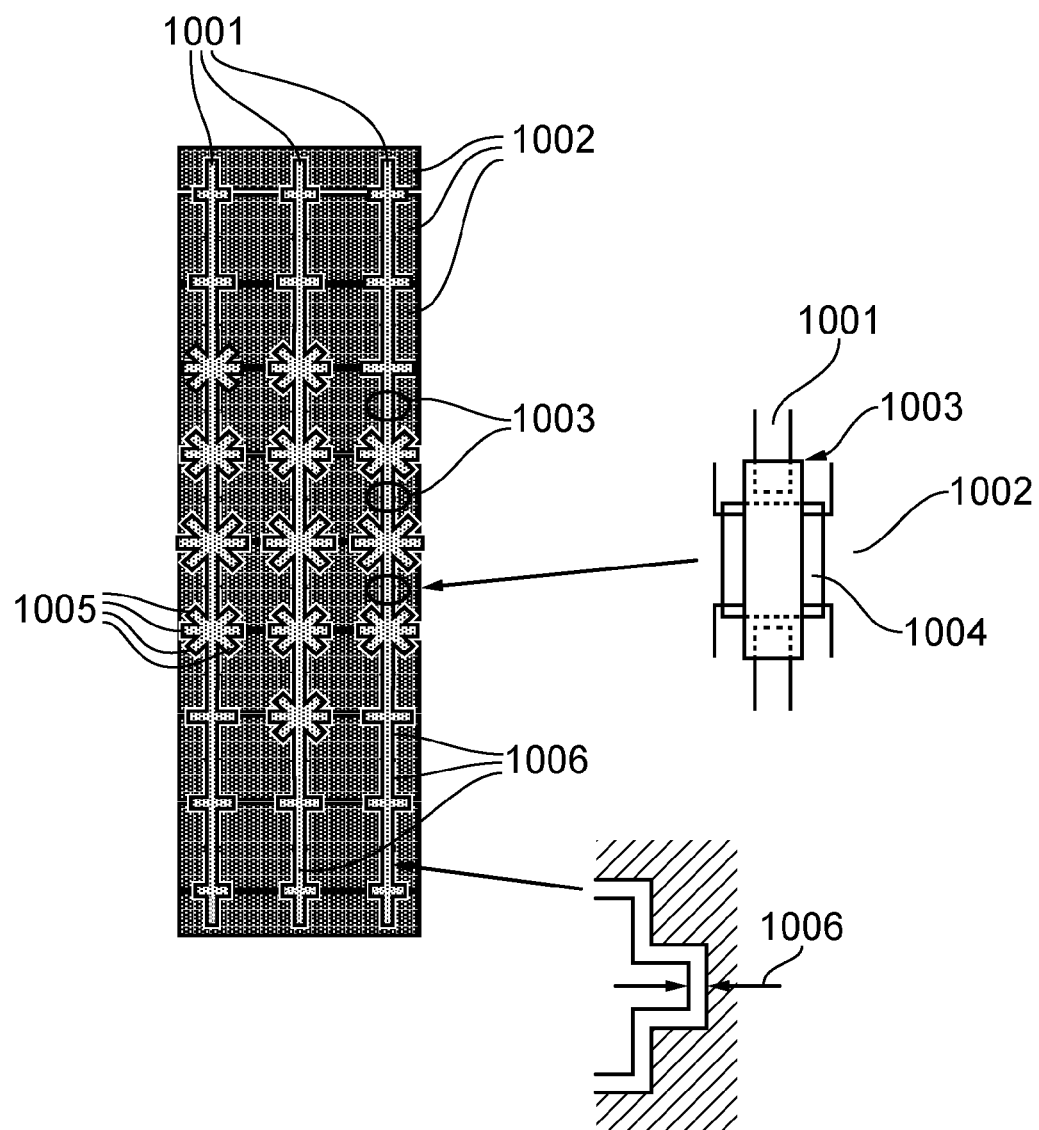
FIG. 10 is a plan view showing the electrode pattern of a mutual-capacitance type touch sensor having a two-dimensionally curved lens according to a fourth embodiment.

FIG. 10 shows an example of a section of a mutual capacitance type sensor in which the transmitter and receiver electrodes are formed on the same surface and so are in the same plane. The receivers 1001 cross over the transmitters 1002 using conductive bridges 1003 over insulated patches 1004, applied as a separate processing step during manufacture. In this example, the fringing field is typically formed side-to-side (substantially parallel to the plane of the electrodes, sometimes called transverse field) where edge portions of the receiver electrodes 1001 interdigitate with correspondingly shaped parts of the transmitter electrodes 1002 with the adjacent portions of the receiver and transmitter electrodes separated by a gap 1006. Various shapes could be envisaged for the interdigitation. The illustrated design has "finger"-like structures 1005. Higher sensitivity is generally realized by increasing the coupling from transmitter to receiver by lengthening and/or increasing the number of fingers coupling at each node. Conversely, reduction in sensitivity can be affected by shortening and/or reducing these fingers.

In FIG. 10 the gap 1006 is shown as substantially constant throughout the array. However, the size of the gap 1006 at each sensing node can be used as a parameter to vary with the thickness of the covering lens, since the size of the gap influences the field projection towards the touching finger. Adjustment to the gap 1006 will help to adapt the pattern to vary the SNR from place to place. The gap size can be increased as the covering thickness increases, so as to compensate for variation in node sensitivity across the sensor. Varying this gap is an alternative to varying the receiver electrode edge length by the degree of interdigitation, the two effects being independent of each other. It could therefore be envisaged in some embodiments that variation of the gap size is the sole parameter used to compensate for variation in node sensitivity. Similarly, other embodiments will have constant gap size. However, a generic embodiment will vary both the degree of interdigitation and the gap size.

In touch screens in particular, it is also important that the electrode pattern is substantially invisible to the user, or at least not striking. Wide gaps between electrodes tend to be particularly visible and hence undesirable, whereas small gaps tend not to be noticeable. A feature which can help achieve the visual impact of wider gaps between electrodes in the pattern is to introduce small, electrically isolated islands of the electrode material in the gaps 1006, perhaps selectively in gaps above a certain threshold width.

Figure 11:
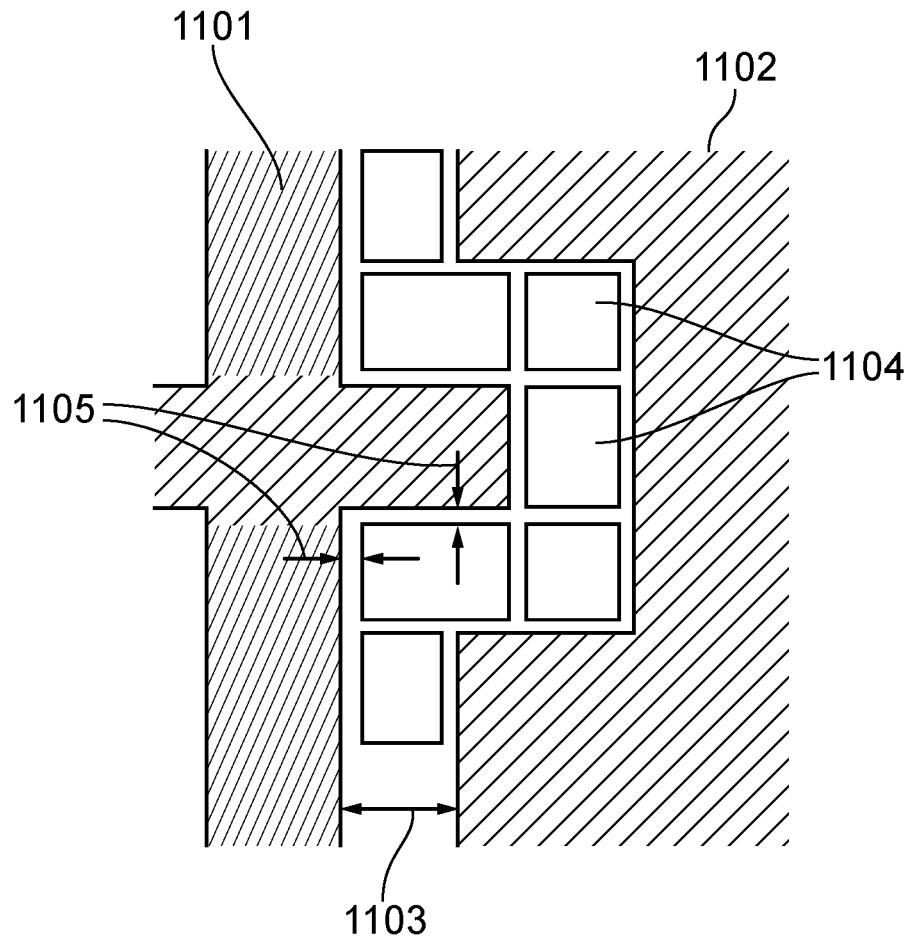
FIG. 11 shows detail of an electrode pattern incorporating an additional feature which is a variant of the fourth embodiment.

FIG. 11 shows a receiver electrode portion 1101 and an adjacent transmitter electrode portion 1102. The electrode portions 1101 and 1102 are separated by a gap 1103. The gap 1103 filled with isolated features 1104 where the physical gap 1105 between adjacent areas of electrode material is made sufficiently small to be un-noticeable. Since the islands are electrically isolated from the electrodes, the electrically effective gap remains the wider gap 1005. Where possible the isolated features 1104 should have sizes that approximate to the feature widths and sizes used by the receiver electrodes 1101 and/or the transmitter electrodes 1102. This helps to disguise the pattern to the naked eye by balancing the ratio between area occupied by the electrodes and isolated features and the area used to isolate those electrodes and features from each other.

GENERAL POINTS & APPLICATION EXAMPLES

It will be understand that the general prior art structures and features described in relation to FIGS. 1 to 4, such as a host processing system, a communication interface 107 and a controller chip, may be incorporated in devices, systems and sub-systems embodying the invention. Moreover, in touch screen embodiments it will be understood that a planar display, such as a liquid crystal display or a light emitting diode display will be arranged under the touch sensor.

It will be appreciated that the sensor according to embodiments of the invention is applicable to many types of device/appliance. For example, sensors can be used with ovens, grills, washing machines, tumble-dryers, dish-washers, microwave ovens, food blenders, bread makers, drinks machines, computers, home audiovisual equipment, personal computers, portable media players, PDAs, cell phones, computers, games consoles and so forth.

In some cases, variations in the cover layer thickness may arise because of aesthetic design considerations, for example where a rounded surface is desired in either one or two dimensions. In other cases, variations in the cover layer thickness may arise because of user interface considerations, for example it may be desired to have locally recessed or locally elevated portions, for example to identify discrete button or key areas (e.g. in control panels for white goods), linear slider areas (e.g. for control of a scalar parameter such as volume or temperature) or circular paths (e.g. for a scroll wheel on a sound reproduction device). It is even possible for the cover panel to incorporate separate physical and/or mechanical elements, such as keys, to provide a user with more traditional tactile feedback.

FIG. 12 shows an example of a mobile personal computer (PC) 1402. The PC 1402 includes a display device 1404 attached to a base 1406, which accommodates a processor and other components typically associated with a PC. An input control panel 1408 includes a keyboard 1410. The input control panel 1410 further includes a touch pad 1412. The touch pad can be implemented using a touch sensor according to the present invention. For example, the touch pad area may have a low point in the centre and gradually rise toward the edges by having a cover panel which is thinnest in the middle and thickest at the periphery. Moreover, the display device 1404 can also be implemented with a touch sensor according to the present invention overlaid on top of it to provide a touch screen. This may be particularly useful for a tablet PC. The display device 1404 has a cover panel of non-uniform thickness, for example incorporating smooth or stepped variations in thickness. A smooth variation in thickness might be a merging of the display 1404 with the bezel 1405 with no step by increasing the thickness of the cover panel near the bezel 1405. A stepped variation in thickness might be inclusion of one or more pimples, i.e. local protrusions, to provide the user with finger navigation reference points on the screen, similar to those provided on home keys "f" and "j" on a conventional QWERTY keyboard.

FIG. 13 schematically shows a washing machine 1514 incorporating a control panel 1516 according to an embodiment of the invention. The control panel may for example have a cover panel of non-uniform thickness with rectangular, square or circular recessed or elevated areas aligned with button positions on the user interface.

FIG. 14 schematically shows a cellular telephone 1616 according to an embodiment of the invention. A touch screen covered by a cover panel 1622 extends over a major portion of the upper surface of the telephone and is embedded in a housing 1618. The touch screen may display icons 1624 which effectively are buttons for the user to press and may signify traditional buttons such as on a telephone or an electronic calculator or software applications, i.e. "apps", to be launched by a touch actuation. The housing 1618 and touch screen cover panel 1622 are formed to form a smooth stepless single unit which necessitates the cover panel 1622 being two-dimensionally curved in the manner of FIG. 5B.

The invention claimed is:

1. A two-dimensional capacitive sensor comprising a cover panel of varying thickness and an electrode panel arranged under the cover panel, the electrode panel comprising a plurality of transmitter electrodes extending in a first direction and a plurality of receiver electrodes extending in a second direction, wherein an array of sensing nodes is formed between edge portions of the receiver electrodes and adjacent portions of the transmitter electrodes, wherein the length of the edge portions per sensing node is varied with the thickness of the cover panel so that the edge portion length per sensing node increases as the thickness increases, so as to provide part or substantially complete compensation for variation in node sensitivity across the sensor which would otherwise exist as a result of the varying thickness of the cover panel, wherein the transmitter electrodes are arranged in a first plane and the receiver electrodes are arranged in a second plane, the sensing nodes being formed by the receiver electrodes crossing the transmitter electrodes, and wherein the receiver electrodes are formed with a spine extending in the second direction and cross-bars extending in the first direction, the edge portion length being varied by varying the length of the cross-bars.

2. The sensor of claim 1, wherein islands of electrode material are arranged adjacent the transmitter electrodes and/or the receiver electrodes to reduce visual impact of the transmitter electrodes and/or the receiver electrodes.

3. The sensor of claim 1, wherein the length of the edge portions per sensing node is varied only in the first direction or the second direction to compensate for variation in the cover panel thickness in the first direction or the second direction respectively.

4. The sensor of claim 1, wherein the length of the edge portions per sensing node is varied both in the first direction and the second direction to compensate for variation in the cover panel thickness in the first direction and the second direction.

5. A two dimensional capacitive sensor comprising a cover panel of varying thickness and an electrode panel arranged under the cover panel, the electrode panel comprising a plurality of transmitter electrodes extending in a first direction and a plurality of receiver electrodes extending in a second direction, where an array of sensing nodes is formed between edge portions of the receiver electrodes and adjacent portions of the transmitter electrodes, wherein the length of the edge portions per sensing node is varied with the thickness of the cover panel so that the edge portion length per sensing node increases as the thickness increases, so as to provide part of substantially complete compensation for variation in node sensitivity across the sensor which would otherwise exist as a result of the varying thickness of the cover panel, wherein the transmitter electrodes are arranged in a first plane and the receiver electrodes are arranged in a second plane, the sensing nodes being formed by the receiver electrodes crossing the transmitter electrodes, and wherein at each sensing node there is an overlap area between crossing portions of the transmitter and receiver electrodes, and wherein the crossing portions of the receiver electrodes are adapted in shape not only to vary the edge portion length with cover panel thickness but also to reduce or substantially eliminate variations in the overlap area caused by varying the edge portion length.

6. The sensor of claim 5, wherein the receiver electrodes are formed with a spine extending in the second direction and cross-bars extending in the first direction, the edge portion length being varied by varying the length of the cross-bars, and variations in the overlap area being reduced or eliminated by making the spine thicker when the cross-bars extend less.

7. The sensor of claim 5, wherein islands of electrode material are arranged adjacent the transmitter electrodes and/or the receiver electrodes to reduce visual impact of the transmitter electrodes and/or the receiver electrodes.

8. The sensor of claim 5, wherein the length of the edge portions per sensing node is varied only in the first direction or the second direction to compensate for variation in the cover panel thickness in the first direction or the second direction respectively.

9. The sensor of claim 5, wherein the length of the edge portions per sensing node is varied both in the first direction and the second direction to compensate for variation in the cover panel thickness in the first direction and the second direction.

\* \* \* \* \*